United States Patent [19]
Pentlicki

[11] 3,923,352
[45] Dec. 2, 1975

[54] BEARING RETAINER STABILIZER
[75] Inventor: Chester John Pentlicki, Gaithersburg, Md.
[73] Assignee: Communications Satellite Corporation, Washington, D.C.
[22] Filed: Dec. 6, 1973
[21] Appl. No.: 422,382

[52] U.S. Cl. ............... 308/191; 308/188; 308/201
[51] Int. Cl.² .......................................... F16C 33/00
[58] Field of Search......... 308/188, 189 R, 191, 201

[56] References Cited
UNITED STATES PATENTS

| | | | |
|---|---|---|---|
| 753,242 | 3/1904 | Deppe | 308/202 |
| 2,584,227 | 2/1952 | Potter | 308/194 |
| 3,011,842 | 12/1961 | Norris | 308/188 |
| 3,016,274 | 1/1962 | Norris | 308/188 |
| 3,454,313 | 7/1969 | Lohneis | 308/189 |

Primary Examiner—M. Henson Wood, Jr.
Assistant Examiner—Richard A. Bertsch
Attorney, Agent, or Firm—Sughrue, Rothwell, Mion, Zinn & Macpeak

[57] ABSTRACT

A magnetic bias is applied to a bearing retainer ring to suppress retainer instability by securing a steel ring to the retainer and mounting a magnet on either the inner or outer race in closely spaced proximity to the ring.

4 Claims, 3 Drawing Figures

BEARING RETAINER STABILIZER

BACKGROUND OF THE INVENTION

1. Field of the Invention

The present invention is directed to means for suppressing the instability of a ball or roller bearing retainer and more specifically to magnetic means mounted on the retainer and one of the bearing races for accomplishing such suppression.

2. Prior Art

Bearing retainer instability is anomalous vibratory motion of the cage or retainer of a ball bearing caused by certain combinations of bearing/retainer geometry and the friction forces between the retainer's ball pockets and the balls leading to excessive torque noise. This extraordinary torque noise is particularly detrimental to the performance of precision mechanisms.

Bearing retainer instability has been a common problem since the invention of ball bearings. Much effort has been expended in search for a solution and common practice has been to discreetly modify the retainer geometry. Techniques such as scalloping of the ball pocket to reduce the friction force component which is developed at the ball/pocket interface have been accomplished in the past with various degrees of succes. The defect in this treatment is that it reduces the surface available for oil passage from the lubricated retainer to the ball, thus damaging the lubrication capacity of the system. Other solutions attempted for this problem have been the adjustment of ball pocket sizes so that retainer instability is controlled to some degree. The difficulty in all of these solutions in that a description of all conditions that may cause ball bearing retainer instability to develop is beyond the state of the art at the present time. Certain influential parameters may vary within an operating bearing causing a normally stable retainer to become unstable at some operating point in its life or under difficult conditions of operation. Another technique for eliminating instability has been eccentrically loading the retainer by use of mass asymmetry within the retainer structure. Such mass asymmetry has the effect of unbalancing the retainer and this unbalancing causes the retainer to be driven to one side of the bearing operating geometry and causing an effect similar to that claimed for the present invention, namely the suppression of instability. The principal drawback with this method is that certain ball pockets adjacent the location of the mass will suffer higher wear because of increased local forces at the ball pocket interfaces.

SUMMARY OF THE INVENTION

The present invention provides a stabilizer which is free of the above-noted defects. By utilizing the magnetic stabilizer arrangement according to the present invention, it is now possible to design ball bearing retainers to maximize performance in matter such as lubricant transfer area or lubricant retention. In the event that such optimization of these and other design factors result in conditions that lead to retainer instability the present invention may be used to suppress such instability and produce a bearing without anomalous torque behavior.

The purpose of the present invention is to suppress retainer instability in ball bearings that are troubled by such phenomena or to provide increased margin over the possible development of retainer instability in nominally stable retainers during the bearing's operating life time. The inveniton is intended to suppress such retainer instability by providing a means of eccentrically loading the retainer in an operating bearing without physical contact or use of mass asymmetries in the retainer. This eccentric loading has the effect of forcing the bearing retainer to one side of the operating bearing, thus providing a preferential operating mode and suppressing bearing retainer instability.

The present invention provides a magnetic bearing retainer stabilizer which would not produce any undue wear on selected ball pockets within the retainer. The relative motion of the retainer to either the outer race or the inner race where the magnet may be mounted results in a rotating force upon the retainer producing no preferred wear at any ball pocket. In the event that additional retainer wear is incurred by the slightly higher forces induced by the magnet, the increased wear will be equally distributed over all ball pockets within the retainer.

The invention consists of using a permanent magnet or electro-magnet to attract a steel ring attached to a normally nonmagnetic retainer; this induces a preferred eccentric operating condition for the retainer and is successful in suppressing instability. The permanent magnetic may be mounted on either the rotor or the starter. An alternate configuration may well be of that of a permanent magnet installed on the retainer itself attracting a metal ring adjacent to the retainer on the bearing's inner or outer raceway.

The foregoing and other objects, features and advantages of the invention will be apparent from the following more particular description of a preferred embodiment of the invention as illustrated in the accompanying drawings.

IN THE DRAWINGS

DETAILED DESCRIPTION OF THE INVENTION

Figure 1:
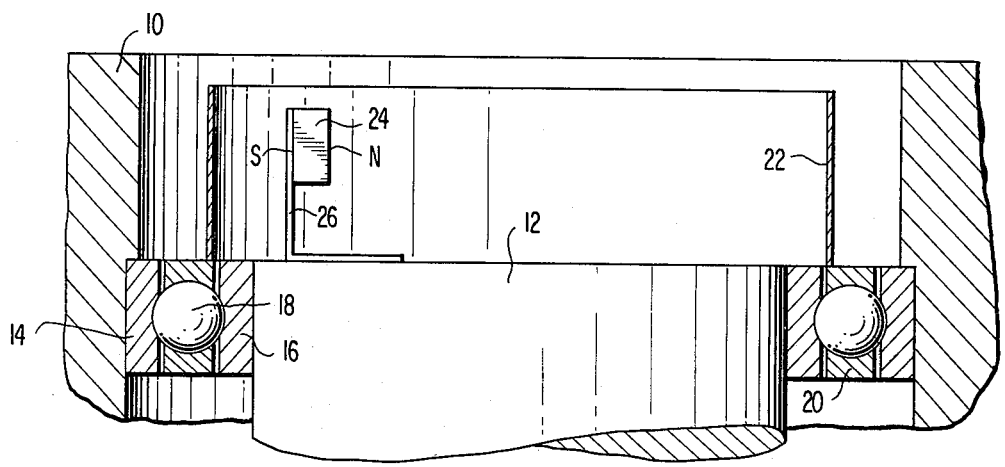
FIG. 1 is a side elevation view, partly in section, showing the magnetic stabilizing means in conjunction with a ball bearing.

A load 10 is journaled on a suitable support 12 by means of a circular ball bearing arrangement. The ball bearing is comprised of an outer race 14 secured to the load 10, an inner race 16 secured to the support 12 and a plurality of balls 18 rotatably disposed in pockets in a retaining ring 20. The ball bearing may be of a conventional type having steel races and balls and a retainer of phenolic or any other suitable material.

A continuous ring 22 of magnetic material is secured to the retainer by any suitable means such as gluing or the like. Suitable support brackets may be provided about the circumference of the steel ring to aid in holding it in position or the steel ring could be embedded directly in the material of the retaining ring. A ermanent magnet 24 is mounted on the support 12 by means of any suitable bracket 26. The magnet may be a samarium-cobalt magnet and the strip 26 may be of plastic or any other nonmagnetic material. The air gap between the magnet 24 and the magnetic ring 22 should be on the order of 3/16 in. to ¼ in. but this could readily be varied depending upon the various dimensions of the bearing, load and support as well as the type of magnet used. It is contemplated that an electromagnet could also be utilized as well as a permanent magnet and the magnet could be located for rotation with the load rather than the support with equal results. The magnet 24 could be spaced a substantial distance above the bearing to minimize the influence of stray fields on the bearing parts. Although the polarity of the magnet 24 is oriented as indicated in FIG. 1, the magnetic bias imparted to the ring 22 would be equally effective if the polarity was reversed. It is also possible to mount the magnet to the retainer and the steel ring on either the rotor 10 or the stator 12.

Figure 3:
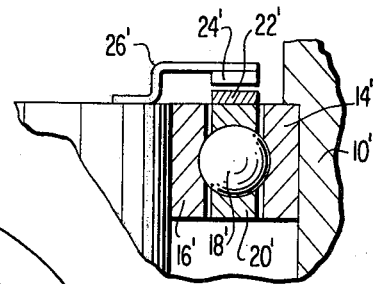
FIG. 3 is a partial side elevation view of a modification.
Figure 2:
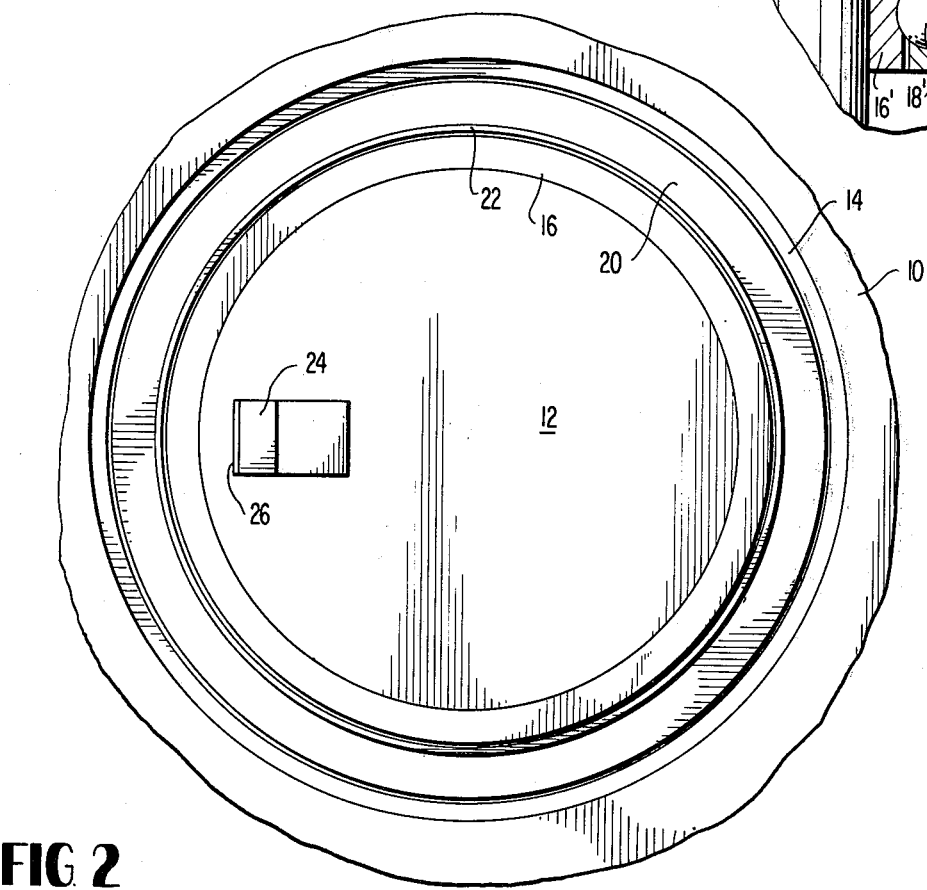
FIG. 2 is a top plan view of the magnetic stabilizing means and bearing shown in FIG. 1

A further modification is illustrated in FIG. 3 wherein an axial magnetic force is applied to the bearing retainer instead of a radial force. A flat annular ring 22' of magnetic material is secured to the upper surface of the retainer 20' by any suitable means such as an adhesive or the like, the magnet 24' is supported by the bracket 26' in overlying, space-apart relation with respect to the ring 22' to apply a suitable magnetic bias or force to the retainer 20' to suppress retainer instability. As set forth above with respect to the radial biasing arrangement the magnet can be secured relative to either race and the magnet and magnetic ring could be reversed.

While the invention has been particularly shown and described with respect to a preferred embodiment thereof it will be understood by those skilled in the art that various changes in form and detail may be made therein without departing from the spirit and scope of the invention.

What is claimed is:

1. In a bearing arrangement between a rotating part and a stationary part wherein said bearing arrangement includes an inner race secured to one of said parts and an outer race secured to the other of said parts and a retaining ring supporting a plurality of rolling elements intermediate said inner and outer races, the improvement comprising magnetic means mounted on said retainer ring and one of said parts for eccentrically loading said retaining ring to suppress instability.

2. In a bearing arrangement as set forth in claim 1 wherein said magnetic means is comprised of a magnet mounted on one of said parts and a ring of magnetic material mounted on said retaining ring.

3. In a bearing arrangement as set forth in claim 1 wherein said magnetic means are mounted to impart a radial bias to said retainer ring.

4. In a bearing arrangement as set forth in claim 1 wherein said magnetic means are mounted to impart an axial bias to said retainer ring.

* * * * *